United States Patent
Ho et al.

(10) Patent No.: US 9,043,070 B2
(45) Date of Patent: May 26, 2015

(54) MOVING DEVICE AND MOVING CONTROL METHOD THEREOF

(71) Applicant: INDUSTRIAL TECHNOLOGY RESEARCH INSTITUTE, Chutung, Hsinchu (TW)

(72) Inventors: Yu-Lun Ho, Hsinchu (TW); Yueh-Ju Pu, Toufen Township, Miaoli County (TW); Chun-Wei Chen, Taichung (TW); Wei-Han Wang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 185 days.

(21) Appl. No.: 13/937,066

(22) Filed: Jul. 8, 2013

(65) Prior Publication Data

US 2014/0054099 A1 Feb. 27, 2014

Related U.S. Application Data

(60) Provisional application No. 61/691,817, filed on Aug. 22, 2012.

(30) Foreign Application Priority Data

Dec. 17, 2012 (TW) .............................. 101147896 A

(51) Int. Cl.
*G05D 1/02* (2006.01)

(52) U.S. Cl.
CPC ............ *G05D 1/0263* (2013.01); *G05D 1/0225* (2013.01); *G05D 1/0265* (2013.01); *G05D 2201/0208* (2013.01)

(58) Field of Classification Search
CPC . G05D 1/0263; G05D 1/0225; G05D 1/0265; G05D 2201/0208
See application file for complete search history.

(56) References Cited

U.S. PATENT DOCUMENTS 6,465,982 B1 * 10/2002 Bergvall et al. ............... 318/587
6,671,592 B1 12/2003 Bisset et al.
(Continued)

FOREIGN PATENT DOCUMENTS

| CN | 1535646 A | 10/2004 |
| CN | 1602263 A | 3/2005 |

(Continued)

OTHER PUBLICATIONS

Ackerman, "Bosch Introduces New Autonomous Robotic Lawnmower," IEEE Spectrum, pp. 1-3 (Jun. 11, 2012).
(Continued)

*Primary Examiner* — Mary Cheung
(74) *Attorney, Agent, or Firm* — Muncy, Geissler, Olds & Lowe, P.C.

(57) ABSTRACT

A moving device and a moving control method thereof are provided. The moving control method comprises the following steps. Firstly, a first magnetic field and a second magnetic field are sensed by a moving device within a moving region. A first magnetic stripe generating the first magnetic field is arranged along an outer border of the moving region, and a second magnetic stripe generating the second magnetic field is arranged along an inner border of the moving region. Then, a motion mode is determined and a corresponding motion is performed by the moving device according to an order in which the first magnetic field and the second magnetic field are sensed.

25 Claims, 6 Drawing Sheets

(56) References Cited

U.S. PATENT DOCUMENTS

| | | | |
|---|---|---|---|
| 6,850,024 B2 | 2/2005 | Peless et al. | |
| 7,844,398 B2 | 11/2010 | Sato et al. | |
| 7,866,202 B2 | 1/2011 | Chen et al. | |
| 2003/0106731 A1 | 6/2003 | Marino et al. | |
| 2004/0181896 A1 | 9/2004 | Egawa et al. | |
| 2005/0267629 A1 | 12/2005 | Petersson et al. | |
| 2006/0156564 A1* | 7/2006 | Kwon et al. | 33/355 R |
| 2006/0232268 A1* | 10/2006 | Arns et al. | 324/207.13 |
| 2011/0226282 A1 | 9/2011 | Choi et al. | |

FOREIGN PATENT DOCUMENTS

| | | |
|---|---|---|
| CN | 101778588 A | 7/2010 |
| JP | S6062907 A | 4/1985 |
| JP | H02193202 A | 7/1990 |
| JP | 05-061545 A | 3/1993 |
| TW | I324678 B | 5/2010 |
| WO | WO 2009/036644 A1 | 3/2009 |

OTHER PUBLICATIONS

Evgeni Kiriy, "A Localization System for Autonomous Golf Course Mowers," McGill University Thesis, pp. 1-122 (Nov. 2002).

Huang et al., "Intelligent Auto-Saving Energy Robotic Lawn Mower," IEEE Systems Man and Cybernetics (SMC) Int'l Conf., pp. 4130-4136 (Jul. 10, 2010).

Van Hook et al., "Moogie the Robotic Lawnmower," Robotic Lawn Mower Competition, http://robomow.ion.org, pp. 1-2 (Jul. 12, 2011).

Surbrook et al., "Robotic Lawn Mower," Proceedings of the Michigan Turfgrass Conference, pp. 52-53 (2010).

Keng-Chih Lin et al., "Study of Intelligent Energy-Saving Automatic Lawn Mower Robot," Thesis for National Chin-Yi University of Technology, Dept of Electronic Engineering, pp. 1-3 (2010).

* cited by examiner

MOVING DEVICE AND MOVING CONTROL METHOD THEREOF

CROSS REFERENCE TO RELATED APPLICATIONS

This application claims the benefit of U.S. provisional application Ser. No. 61/691,817, filed Aug. 22, 2012, the subject matter of which is incorporated herein by reference, and claims the benefit of Taiwan application Serial No. 101147896, filed Dec. 17, 2012, the disclosure of which is incorporated by reference herein in its entirety.

TECHNICAL FIELD

The disclosure relates in general to a moving device and a moving control method thereof, and more particularly to a moving device determining a motion mode according to a magnetic field and a moving control method thereof.

BACKGROUND

A conventional mower moves at random within a closed range to remove the weeds within the range. A continuous conductive wire, arranged along an outer border and an inner border of the closed range, is conducted to generate a magnetic field after current pass through the continuous conductive wire. When the mower moves to a border, the mower determines the border of the closed range by sensing the magnetic field, and then returns to the closed range to continue mowing the weeds at random. However, when the continuous conductive wire is cut off by the mower and ends up with power failure, the continuous conductive wire is no longer able to generate the magnetic field. Under such circumstance, the mower is unable to determine the border of the closed range, and may move outside the closed range.

SUMMARY

According to one embodiment, a moving device is provided. The moving device can be moved within a moving region. A first magnetic stripe is arranged along an outer border of the moving region, and a second magnetic stripe is arranged along an inner border of the moving region. The first magnetic stripe generates a first magnetic field, and the second magnetic stripe generates a second magnetic field different from the first magnetic field. The moving device comprises a body, a magnetic sensing module, a driving mechanism and a controller. The magnetic sensing module is disposed on the body for sensing the first magnetic field and the second magnetic field. The driving mechanism is disposed on the body for driving the body to move. The controller determines a motion mode of the driving mechanism driving the body according to an order in which the first magnetic field and the second magnetic field are sensed by the magnetic sensing module and controls the driving mechanism to drive the body to perform a corresponding motion.

According to another embodiment, a moving control method of a moving device is disclosed. The moving control method comprises the following steps. Whether a first magnetic field or a second magnetic field is sensed by a moving device within a moving region is determined, wherein a first magnetic stripe is arranged along an outer border of the moving region, and a second magnetic stripe is arranged along an inner border of the moving region, the first magnetic stripe generates the first magnetic field, and the second magnetic stripe generates the second magnetic field different from the first magnetic field. If the first magnetic field or the second magnetic field is sensed by the moving device, then the moving device determines a motion mode and performs a corresponding motion according to an order in which the first magnetic field and the second magnetic field are sensed.

Figure 1:
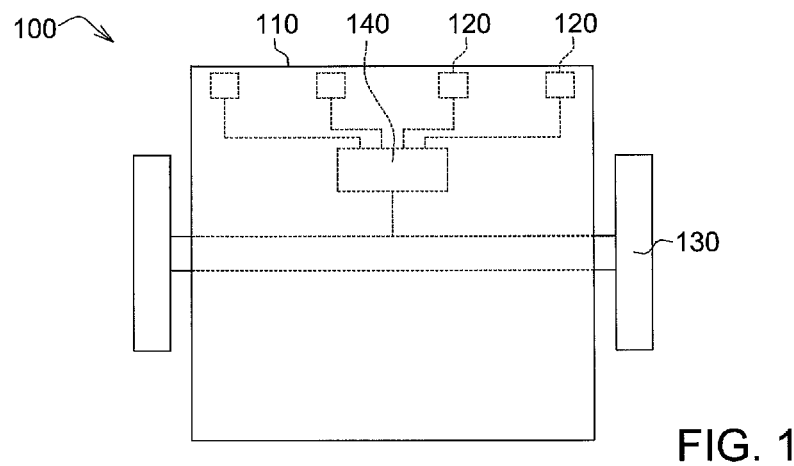
FIG. 1 shows an appearance diagram of a moving device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, an appearance diagram of a moving device according to an embodiment of the disclosure is shown. The moving device 100, such as a mower, a vacuum machine, a cleaning robot or other types of robot or mobile platform, can be operated in households, business entities, lawns, parks or exhibition venues, for example. The moving device 100 comprises a body 110, at least a magnetic sensing module 120, a driving mechanism 130 and a controller 140.

The magnetic sensing module 120 can be disposed inside or outside the body 110. For example, the magnetic sensing module 120 can be disposed near the front surface, rear surface, upper surface, lower surface and/or any side surface of the body 110 for sensing the intensity of a magnetic field and/or the intensity in a direction of a magnetic field.

The driving mechanism 130, formed by a drive shaft, a differential, a transmission mechanism, a driving belt and/or a drive roller, for example, is disposed on the body 110 for driving the body 110 to move. The embodiment of the disclosure does not restrict the structure of the driving mechanism 130, and any structure would do as long as the driving mechanism 130 can drive the body 110 to move.

The controller 140 determines a motion mode of the driving mechanism 130 driving the body 110 according to the magnetic pole of the magnetic field sensed by the magnetic sensing module 120, and controls the driving mechanism 130 to drive the body 110 to perform a corresponding motion to according to the motion mode. The controller 140, such as a single-chip microcomputer also referred as microcontroller, integrates a central processor, a memory, a timer/counter, and various I/O interfaces onto one single IC chip. The disclosure does not restrict the types and varieties of the controller 140, and any controllers capable of performing the functions of an IC, a controller, a processor and/or a circuit module can be used as the controller 140 of the embodiment of the disclosure.

Figure 2:
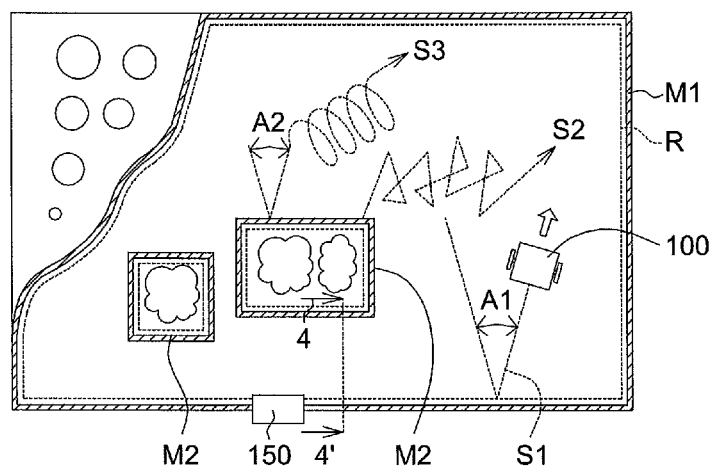
FIG. 2 shows an appearance diagram of a moving device within a moving region motion according to an embodiment of the disclosure.

Referring to FIG. 2, an appearance diagram of a moving device within a moving region motion according to an embodiment of the disclosure is shown. The moving device 100 can be moved within a moving region R, wherein the first magnetic stripe M1 is arranged along an outer border of the moving region R, and the second magnetic stripe M2 surrounds the obstacles within the moving region R to define an inner border of the moving region R. Here, the obstacles refer to the objects that the moving device 100 are unable to or are expected not to pass through.

The first magnetic stripe M1 and the second magnetic stripe M2 form a closed loop. In another example, the first magnetic stripe M1 and/or the second magnetic stripe M2 can form an open loop. In the present example, each of the first magnetic stripe M1 and the second magnetic stripe M2 is a continuous magnetic stripe. In another example, the first magnetic stripe M1 and/or the second magnetic stripe M2 can be formed by a plurality of separate sub-magnetic stripes. In the present example, the first magnetic stripe M1 and the second magnetic stripe M2 are separated from each other but the embodiment of the disclosure is not limited thereto.

Figure 3:
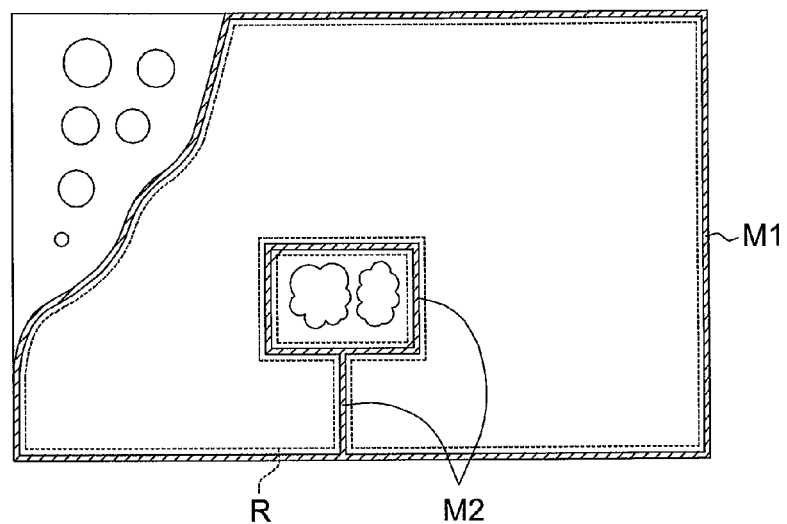
FIG. 3 shows a schematic diagram of a first magnetic stripe according to another embodiment of the disclosure.

Referring to FIG. 3, a schematic diagram of a first magnetic stripe according to another embodiment of the disclosure. The first magnetic stripe M1 and the second magnetic stripe M2 can be connected to each other.

Figure 4:
FIG. 4 shows a cross-sectional view along a direction 4-4' of FIG. 2.

Referring to FIG. 4, a cross-sectional view along a direction 4-4' of FIG. 2 is shown. The disposition direction of the magnetic pole of the first magnetic stripe M1 is different from that of the second magnetic stripe M2. For example, the first magnetic stripe M1 is disposed with the N polarity facing upward and the S polarity facing downward for generating a first magnetic field, and the second magnetic stripe M2 is disposed with the S polarity facing upward and the N polarity facing downward for generating a second magnetic field. In another example, the first magnetic stripe M1 is disposed with the S polarity facing upward and the N polarity facing downward; the second magnetic stripe M2 is disposed with the N polarity facing upward and the S polarity facing downward. Since the disposition direction of the magnetic pole of the first magnetic stripe M1 is different from that of the second magnetic stripe M2, the first magnetic field is different from the second magnetic field, and the moving device 100 can recognize the border or obstacle. The operation efficiency can be increased when corresponding motion mode is taken in conjunction with the setting of the working environment. In another embodiment, the first magnetic stripe M1 and the second magnetic stripe M2 can have the same disposition direction of the magnetic pole but different magnitudes of magnetic force, such that the first magnetic field is still different from the second magnetic field, and the moving device 100 can thus recognize the border or obstacle.

Figure 5A:
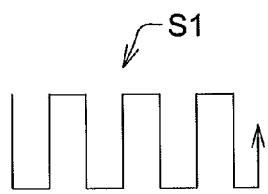
FIGS. 5A-5C show motion curve charts of a moving device according to an embodiment of the disclosure.
Figure 5B:
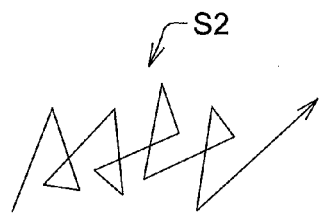
Figure 5C:
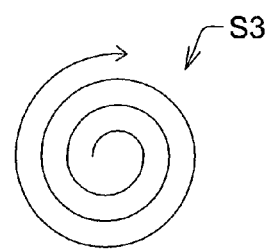

Referring to FIGS. 5A~5C, motion curve charts of a moving device according to an embodiment of the disclosure are shown. The moving device 100 determines the motion mode according to an order in which the first magnetic field and/or the second magnetic field are sensed, and performs a corresponding motion, such as a returning motion S1 (illustrated in FIG. 5A), a spiral motion S3 (illustrated in FIG. 5C), a random motion S2 (illustrated in FIG. 5B), an S-shaped motion, a polygonal motion and/or an edge-tracing motion. The non-conducted magnetic stripe still can generate a magnetic field. Therefore, the magnetic stripe still can generate a magnetic field even when the magnetic stripe is accidentally damaged (such as broken off) by the moving device 100.

Figure 6:
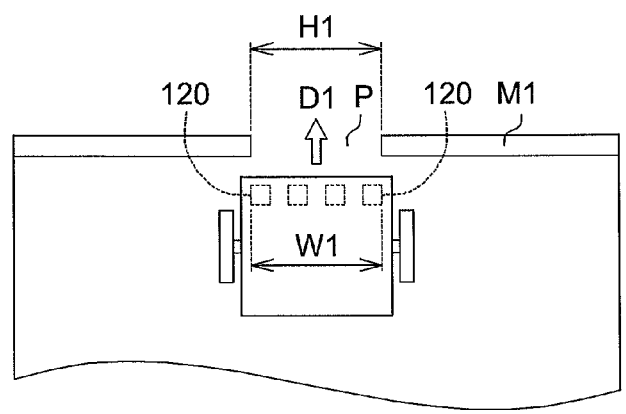
FIG. 6 shows a schematic diagram of a first magnetic stripe according to another embodiment of the disclosure.

Referring to FIG. 6, a schematic diagram of a first magnetic stripe according to another embodiment of the disclosure is shown. The first magnetic stripe M1 has an opening P having an opening width H1. As long as the opening width H1 is smaller than the distribution width W1 of the magnetic sensing module 120, the moving device 100 can sense the magnetic field of the first magnetic stripe M1, and can only move within the moving region R. Or, the opening width H1 does not have to be smaller than the distribution width W1, and any opening width would do as long as the magnetic sensing module 120 of the moving device 100 can sense the magnetic field of the first magnetic stripe M1 along a proceeding direction D1.

Figure 7:
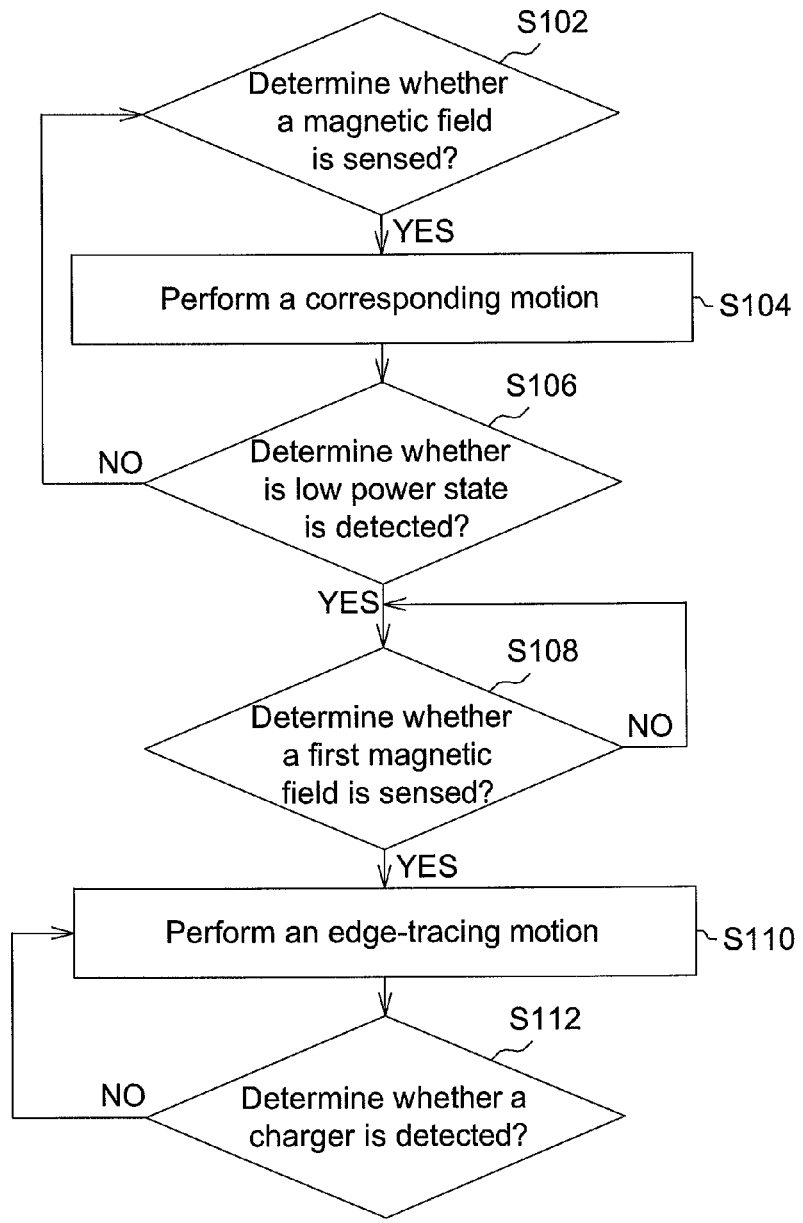
FIG. 7 shows a flowchart of a moving control method of a moving device according to an embodiment of the disclosure.

Referring to FIG. 7, a flowchart of a moving control method of a moving device according to an embodiment of the disclosure is shown.

In step S102, the controller 140 of the moving device 100 determines whether the magnetic sensing module 120 senses a first magnetic field generated by the first magnetic stripe M1 or a second magnetic field generated by the second magnetic stripe M2. If yes, the method proceeds to step S104; if no, the method returns to step S102.

In step S104, the controller 140 determines a motion mode of the moving device 100 according to an order in which the first magnetic field and the second magnetic field are sensed, and performs a corresponding motion. Details are exemplified below with FIGS. 8A and 8B.

Figure 8A:
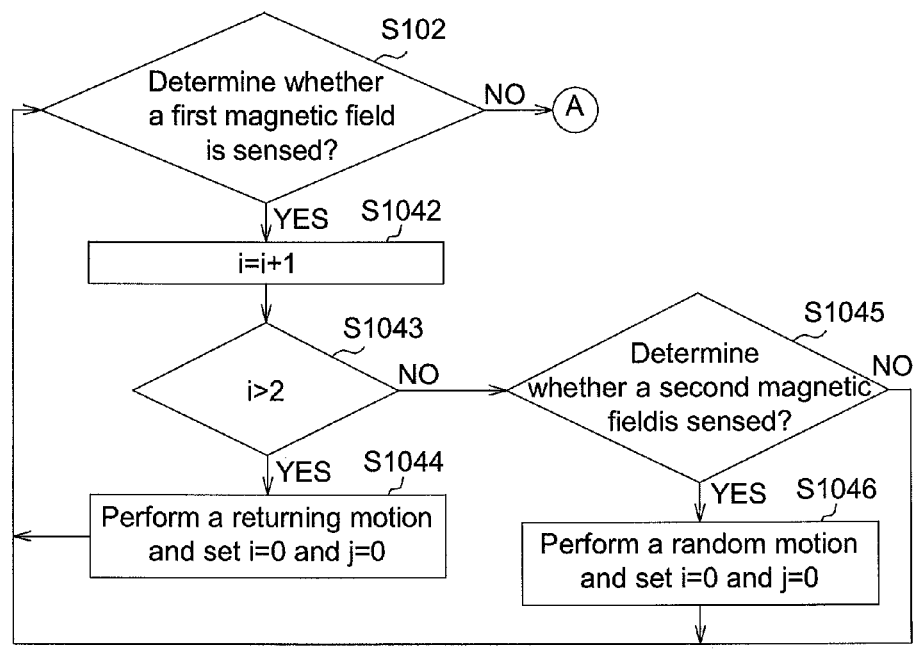
FIGS. 8A and 8B show implementation processes of step S104 of FIG. 7.
Figure 8B:
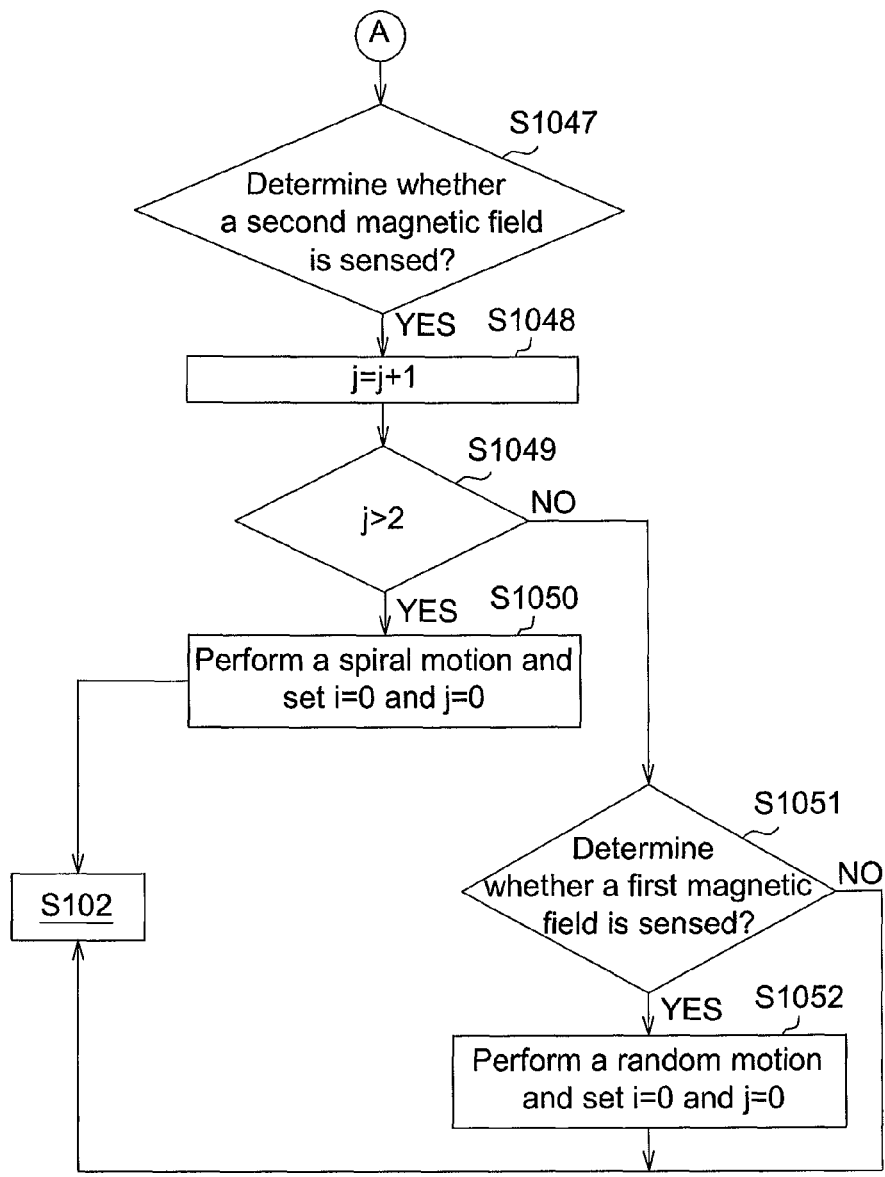

Referring to FIGS. 8A and 8B, implementation processes of step S104 of FIG. 7 are shown. The implementation in which the magnetic sensing module 120 senses the first magnetic stripe M1 (outer border) first is disclosed below.

In step S102, the controller 140 determines whether the magnetic sensing module 120 senses a first magnetic field generated by the first magnetic stripe M1. If yes, the method proceeds to step S1042; if no, the method proceeds to step S1047 (illustrated in FIG. 8B). Details of step S1042 are disclosed below.

In step S1042, the controller 140 sets i=i+1, wherein the default value of i is set as 0. Then, the method proceeds to step S1043.

In step S1043, the controller 140 determines whether the magnetic sensing module 120 has sensed the first magnetic field for more than two consecutive times (i>2 or i≥2). If yes, the method proceeds to step S1044; if no, the method proceeds to step S1045.

In step S1044, if the controller 140 determines that the magnetic sensing module 120 has sensed the first magnetic field for more than two consecutive times, which indicates that the moving device 100 may be located within a non-obstacle region, then the controller 140 determines the motion mode as a first motion mode and controls the driving mechanism 130 to drive the body 110 to perform a corresponding motion, such as a returning motion S1 (illustrated in FIG. 5A), and sets i=0 and j=0.

When the moving device 100 senses the first magnetic field, the controller 140 can control the moving device 100 to return at a turning angle A1 (illustrated in FIG. 2). Within the non-obstacle region, the moving device 100 may have a larger turning angle A1 (in comparison to the turning angle when the moving device 100 is within an obstacle region) for expanding the motion range of the moving device 100.

In step S1045, if the controller 140 determines that the magnetic sensing module 120 has not yet sensed the first magnetic field for more than two consecutive times, the controller 140 continues to determine whether the magnetic sensing module 120 senses a second magnetic field generated by the second magnetic stripe M2. If yes, the method proceeds to step S1046; if no, the method proceeds to step S1046.

In step S1046, if the magnetic sensing module 120 senses the second magnetic stripe M2, this indicates that the moving device 100 may have entered an obstacle region. Under such circumstance, the controller 140 determines the motion mode as a second motion mode, and controls the driving mechanism 130 to drive the body 110 to perform a corresponding motion, such as a random motion S2 (FIG. 5B), and set i=0 and j=0.

When the moving device 100 senses the second magnetic field, the controller 140 may control the moving device 100 to return at a turning angle A2 (FIG. 2). Within the obstacle region, the turning angle A2 of the moving device 100 can be made smaller (in comparison to the turning angle when the moving device 100 is within the non-obstacle region) such that the length of the path travelled by the moving device 100 can be increased.

In another embodiment, the controller 140 sets the turning angle A1 of the first motion mode to be larger than the turning angle A2 of the second motion mode.

The implementation in which the magnetic sensing module 120 senses the second magnetic stripe M2 first (step S102 → step S1047) is disclosed below.

Referring to FIG. 8B. In step S1047, the controller 140 determines whether the magnetic sensing module 120 senses a second magnetic field generated by the second magnetic stripe M2. If yes, the method proceeds to step S1048.

In step S1048, the controller 140 sets j=j+1, wherein the default value of j is 0. Then, the method proceeds to step S1049.

In step S1049, the controller 140 determines whether the magnetic sensing module 120 has sensed the second magnetic field for more than two consecutive times (j>2 or j≥2). If yes, the method proceeds to step S1050; if no, the method proceeds to step S1051.

In step S1050, if the controller 140 determines that the magnetic sensing module 120 has sensed the second magnetic field for more than two consecutive times, this indicates that the moving device 100 is located within an obstacle region. Under such circumstance, the controller 140 determines the motion mode as a third motion mode, and controls the driving mechanism 130 to drive the body 110 to perform a corresponding motion, such as a spiral motion S3 (FIG. 5C), and sets i=0 and j=0.

In step S1051, the controller 140 determines whether the magnetic sensing module 120 senses a first magnetic field generated by the first magnetic stripe M1. If yes, the method proceeds to step S1052.

In step S1052, if the magnetic sensing module 120 senses the first magnetic stripe M1, this indicates that the moving device 100 may have entered the non-obstacle region. Under such circumstance, the controller 140 determines the motion mode as a fourth motion mode, and controls the driving mechanism 130 to drive the body 110 to perform a corresponding motion, such as a random motion S2 (illustrated in FIG. 5B), and sets 1=0 and j=0.

In another embodiment, the second motion mode and the fourth motion mode are the same, and their corresponding motions are also the same.

To summarize, the moving device 100 may determine its moving path and motion parameter according to an order in which and/or the number of times for which the first magnetic field and/or the second magnetic field are sensed and/or the directions of the magnetic fields. The moving path is at least one of the returning motion, the spiral motion, the random motion and the edge-tracing motion, and the motion parameter is at least one of the turning angle, the motion speed and the returning course.

Referring to FIG. 7. In step S106, the controller 140 determines whether the moving device 100 is in a low power state. If yes, the method proceeds to step S108.

In step S108, if the moving device 100 is in the low power state, the controller 140 determines whether the magnetic sensing module 120 senses the first magnetic field. If yes, the method proceeds to step S110; if no, the controller 140 controls the moving device 100 to continue moving until the first magnetic field is sensed.

In step S110, if the magnetic sensing module 120 senses the first magnetic field, the controller 140 controls the driving mechanism 130 to drive the body 110 to perform an edge-tracing motion to find a charger 150 (FIG. 2).

In step S112, the controller 140 determines whether the moving device 100 has found the charger 150. If yes, the moving device 100 is automatically connected to the charger 150 for charging. Or, the moving device 100 stays in the vicinity of the charger 150, and enters a power saving mode. If the moving device 100 has not yet found the charger 150, then body 110 continues to perform the edge-tracing motion.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A moving device moved within a moving region, wherein a first magnetic stripe is arranged along an outer border of the moving region, a second magnetic stripe is arranged along an inner border of the moving region, the first magnetic stripe generates a first magnetic field, the second magnetic stripe generates a second magnetic field different from the first magnetic field, and the moving device comprises:
   a body;
   a magnetic sensing module disposed on the body for sensing the first magnetic field and the second magnetic field;
   a driving mechanism disposed on the body for driving the body to move; and
   a controller used for determining a motion mode of the driving mechanism driving the body according to an order in which the first magnetic field and the second magnetic field are sensed by the magnetic sensing module, and for controlling the driving mechanism to drive the body to perform a corresponding motion.

2. The moving device according to claim 1, wherein if the magnetic sensing module has sensed the first magnetic field for equal to or more than two consecutive times, the controller determines the motion mode as a first motion mode.

3. The moving device according to claim 2, wherein if the magnetic sensing module senses the second magnetic field when the magnetic sensing module has not yet sensed the first magnetic field for equal to or more than two consecutive times, the controller determines the motion mode as a second motion mode.

4. The moving device according to claim 3, wherein the motion corresponding to the second motion mode is a random motion.

5. The moving device according to claim 4, wherein the controller sets a turning angle of the first motion mode to be larger than that of the second motion mode.

6. The moving device according to claim 2, wherein the motion corresponding to the first motion mode is a returning motion.

7. The moving device according to claim 1, wherein if the magnetic sensing module has sensed the second magnetic field for equal to or more than two consecutive times, the controller determines the motion mode as a third motion mode.

8. The moving device according to claim 7, wherein if the magnetic sensing module senses the first magnetic field when the magnetic sensing module has not yet sensed the second magnetic field for equal to or more than two consecutive times, the controller determines the motion mode as a fourth motion mode.

9. The moving device according to claim 8, wherein the motion corresponding to the fourth motion mode is a random motion.

10. The moving device according to claim 7, wherein the motion corresponding to the third motion mode is a spiral motion.

11. The moving device according to claim 1, wherein a charger is located in the outer border, and when the moving device is in a low power state and the magnetic sensing module senses the first magnetic field, the controller controls the driving mechanism to drive the body to perform an edge-tracing motion for enabling the moving device to find the charger along the first magnetic stripe.

12. The moving device according to claim 1, wherein each of the first magnetic stripe and the second magnetic stripe is a closed or an open loop, or are composed of a plurality of sub-magnetic stripes.

13. The moving device according to claim 1, wherein the first magnetic stripe and the second magnetic stripe are separated from each other.

14. The moving device according to claim 1, wherein the first magnetic stripe and the second magnetic stripe are connected to each other.

15. A moving control method of a moving device, comprising:
   driving a moving device to move within a moving region, wherein a first magnetic stripe is arranged along an outer border of the moving region, a second magnetic stripe is arranged along an inner border of the moving region, the first magnetic stripe generates a first magnetic field, and the second magnetic stripe generates a second magnetic field different from the first magnetic field;
   determining whether the first magnetic field and the second magnetic field are sensed by the moving device using a magnetic sensing module; and
   determining a motion mode by the moving device according to an order in which the first magnetic field and the second magnetic field are sensed and performing a corresponding motion if the moving device senses the first magnetic field and the second magnetic field.

16. The moving control method according to claim 15, wherein in the step of determining the motion mode by the moving device according to the order in which the first magnetic field and the second magnetic field are sensed, the method comprises:
   determining by the moving device whether the moving device has sensed the first magnetic field for equal to or more than two consecutive times; and
   determining the motion mode as a first motion mode by the moving device if the moving device has sensed the first magnetic field for equal to or more than two consecutive times.

17. The moving control method according to claim 16, wherein in the step of determining the motion mode by the moving device according to an order in which the first magnetic field and the second magnetic field are sensed by the magnetic sensing module, the method comprises:
   determining by the moving device whether the moving device has entered the second magnetic field if the moving device has not yet sensed the first magnetic field for equal to or more than two consecutive times; and
   determining the motion mode as a second motion mode by the moving device if the moving device senses the second magnetic field when the moving device has not yet sensed the first magnetic field for equal to or more than two consecutive times.

18. The moving control method according to claim 17, wherein the motion corresponding to the second motion mode is a random motion.

19. The moving control method according to claim 17, further comprising:
   setting a turning angle of the first motion mode to be larger than that of the second motion mode by the moving device.

20. The moving control method according to claim 16, wherein the motion corresponding to the first motion mode is a returning motion.

21. The moving control method according to claim 15, wherein in the step of determining the motion mode by the moving device according to the order in which the first magnetic field and the second magnetic field are sensed by the magnetic sensing module, the method comprises:
   determining by the moving device whether the moving device has sensed the second magnetic field for equal to or more than two consecutive times; and
   determining the motion mode as a third motion mode by the moving device if the moving device has sensed the second magnetic field for equal to or more than two consecutive times.

22. The moving control method according to claim 21, wherein in the step of determining the motion mode by the moving device according to the order in which the first magnetic field and the second magnetic field are sensed by the magnetic sensing module, the method comprises:
   determining by the moving device whether the first magnetic field is sensed if the moving device has not yet sensed the second magnetic field for equal to or more than two consecutive times; and
   determining the motion mode as a fourth motion mode by the moving device if the moving device senses the first magnetic field when the moving device has not yet sensed the second magnetic field for equal to or more than two consecutive times.

23. The moving control method according to claim 22, wherein the motion corresponding to the fourth motion mode is a random motion.

24. The moving control method according to claim 21, wherein the motion corresponding to the third motion mode is a spiral motion.

25. The moving control method according to claim 15, further comprising:
   determining whether the moving device is in a low power state;
   in the step of performing the corresponding motion by the moving device according to the order in which the first magnetic field and the second magnetic field are sensed by the magnetic sensing module, the method comprises:
   performing an edge-tracing motion by the moving device to find a charger along the first magnetic stripe if the moving device is in the low power state and the moving device senses the first magnetic field.

* * * * *